US008838796B2

United States Patent
Cohen et al.

(10) Patent No.: US 8,838,796 B2
(45) Date of Patent: Sep. 16, 2014

(54) SYSTEM AND METHOD FOR ALLOCATING ONLINE STORAGE TO COMPUTER USERS

(75) Inventors: Gary B. Cohen, San Diego, CA (US); Matthew A. Wormley, San Luis Obispo, CA (US)

(73) Assignee: Adobe Systems Incorporated, San Jose, CA (US)

( * ) Notice: Subject to any disclaimer, the term of this patent is extended or adjusted under 35 U.S.C. 154(b) by 315 days.

(21) Appl. No.: 12/339,972

(22) Filed: Dec. 19, 2008

(65) Prior Publication Data

US 2014/0032760 A1  Jan. 30, 2014

(51) Int. Cl.
*G06F 15/16* (2006.01)

(52) U.S. Cl.
USPC ............ 709/226; 709/203; 709/219; 709/223

(58) Field of Classification Search
USPC ......... 709/203, 217, 219, 223, 224, 225, 226, 709/227, 228, 229, 232
See application file for complete search history.

(56) References Cited

U.S. PATENT DOCUMENTS

| | | | |
|---|---|---|---|
| 6,330,572 B1 | 12/2001 | Sitka | |
| 6,470,360 B1 * | 10/2002 | Vaitheeswaran | 1/1 |
| 7,464,152 B2 * | 12/2008 | Ishizaki et al. | 709/223 |
| 7,716,275 B1 * | 5/2010 | Nagaralu et al. | 709/203 |
| 7,720,935 B2 * | 5/2010 | Anantha | 709/219 |
| 8,046,378 B1 * | 10/2011 | Zhuge et al. | 707/783 |
| 2002/0059427 A1 * | 5/2002 | Tamaki et al. | 709/226 |
| 2006/0224739 A1 * | 10/2006 | Anantha | 709/226 |
| 2008/0109820 A1 * | 5/2008 | Raghunandan | 719/313 |
| 2008/0189522 A1 * | 8/2008 | Meil et al. | 712/220 |
| 2008/0228899 A1 * | 9/2008 | Plamondon | 709/219 |

* cited by examiner

*Primary Examiner* — Barbara Burgess
(74) *Attorney, Agent, or Firm* — Shook, Hardy & Bacon L.L.P.

(57) ABSTRACT

A system and method of allocating storage space in a computer system is disclosed. In the disclosed system, computer resources are allocated using a quota system that employs quota identifiers. An allocation system creates quota identifiers and each quota identifier is assigned a specific quota value. Computer resources are then assigned to users by assigning quota identifiers to the users. Additional amounts may be allocated to specific users by created extension quota identifiers and associating those quota identifiers with specific users.

18 Claims, 4 Drawing Sheets

SYSTEM AND METHOD FOR ALLOCATING ONLINE STORAGE TO COMPUTER USERS

TECHNICAL FIELD

The present invention relates to the field of computer networking systems. In particular, but not by way of limitation, the present invention discloses techniques for allocating computer resources to computer users.

BACKGROUND

The global internet has become a mass commercial marketplace. The internet offers a wide variety of media such news websites, downloadable music, and video. The internet also offers commercial services such as investment services, real estate services, banking, and computer services. The internet even provides a convenient means of obtaining physical products through the use of online merchants and auction sites that will deliver purchased products to your door.

Over the past twenty years many very large commercial businesses have been founded, grown, and prospered on the internet. These internet-centric businesses can provide various goods and services to consumers in a very efficient manner since automated systems are used to perform much of the interaction with the consumers. By reducing interactions with humans, internet based businesses can save extremely large amounts of money on labor costs.

One type of internet based service is providing online presence to users. For example, web site hosting services will provide all the software, hardware, internet services, and development tools to allow a company to create and host an internet site. Such services allow a business to focus on its core competency instead of having to deal with the technology involved with hosting and maintaining an internet web site.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Figure 1:
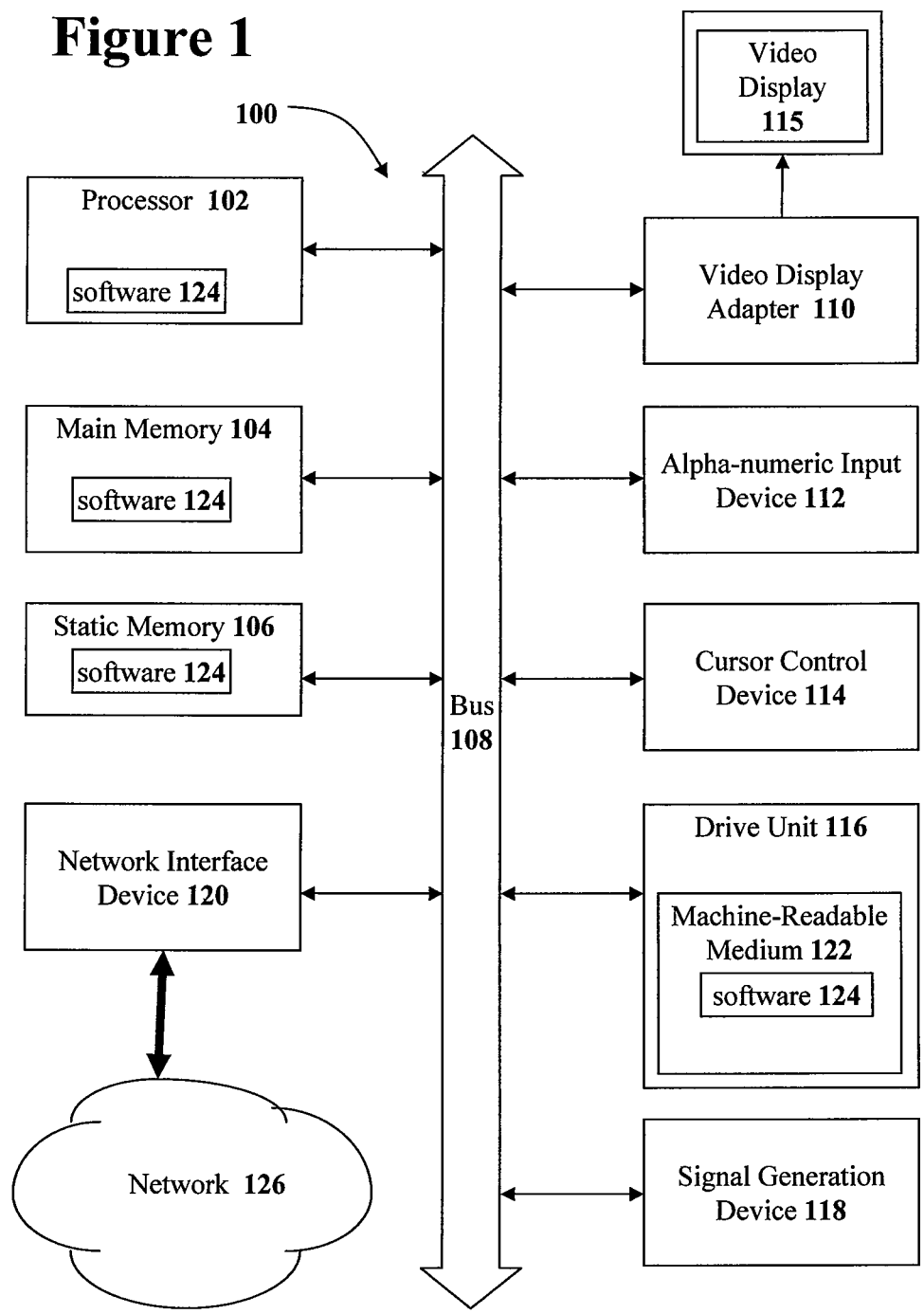
FIG. 1 illustrates a diagrammatic representation of machine in the example form of a computer system within which a set of instructions, for causing the machine to perform any one or more of the methodologies discussed herein, may be executed.

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to online applications that require storage space, the teachings of the invention can be used with other types of computer resources. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Computer Systems

FIG. 1 illustrates a diagrammatic representation of a machine in the example form of a computer system 100 within which a set of computer instructions 124, for causing the machine to perform any one or more of the methodologies discussed herein, may be executed. In a networked deployment, the machine may operate in the capacity of a server system or a client system in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network server, a network router, a network switch, a network bridge, or any machine capable of executing a set of instructions (sequential or otherwise) that specify actions to be taken by that machine. Further, while only a single machine is illustrated in the example embodiment of FIG. 1, the term "machine" shall also be taken to include any collection of machines that individually or jointly execute a set (or multiple sets) of computer instructions to perform any one or more of the methodologies discussed herein. Furthermore, a single machine may be used to designate a cluster of computer systems that are all assigned to provide the same computer service.

The example computer system 100 illustrated in FIG. 1 includes a processor 102 (e.g., a central processing unit (CPU), a graphics processing unit (GPU) or both), a main memory 104, and a static memory 106 that may communicate with each other via a bus 108. The computer system 100 may further include a video display adapter 110 that drives a video display system 115 such as a Liquid Crystal Display (LCD) or a Cathode Ray Tube (CRT). The example computer system 100 also includes an alphanumeric input device 112 (e.g., a keyboard), a cursor control device 114 (e.g., a mouse or trackball), a disk drive unit 116, a signal generation device 118 (e.g., such as a sound system for driving a speaker), and a network interface device 120. Note that various embodiments of a computer system will not always include all of these peripheral devices.

The disk drive unit 116 includes a machine-readable medium 122 on which is stored one or more sets of computer instructions and data structures (e.g., instructions 124 also known as 'software') embodying or utilized by any one or more of the methodologies or functions described in this document. The computer instructions 124 may also reside, completely or at least partially, within the main memory 104, the static memory 106, and/or within the processor 102 during execution thereof by the computer system 100. Thus, the main memory 104, static memory 106, and the processor 102 also constituting machine-readable media.

The computer instructions 124 for operating computer system 100 may be transmitted or received over a computer network 126 via the network interface device 120 utilizing any one of a number of well-known transfer protocols such as the File Transfer Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, flash memory, and magnetic media.

For the purposes of this specification, the term "module" includes an identifiable portion of computer code, computational or executable instructions, data, or computational object to achieve a particular function, operation, processing, or procedure. A module need not be implemented in software; a module may be implemented in software, hardware/circuitry, or a combination of software and hardware.

Client-Server Operations on the Internet

Computer systems that are coupled to a computer network, listen for service requests from other computer system, and then provide services when requested are known as "server" computer systems. Typical services provided by server computer systems include storing and retrieving computer information, performing specific processing tasks, responding to search requests, sending information to another entity, and resolving network addresses. The computer systems that request services from server computer systems are known as "client" computer systems.

On the global internet, two very well known server based applications are email and the World Wide Web (commonly known just using the term 'web'). With email, a personal computer user typically runs a local email client program on the user's personal computer system. When the user wishes to send a newly composed email message or check if the user has received any new email messages, the local email client program will contact a designated email server system and request that the email server system route the new composed email or check for new email, respectively. With the World Wide Web, a personal computer user typically runs a web browser program on the computer user's local personal computer system. When the user wishes to view an internet web site on the World Wide Web, the user enters a network address of the desired web site into the web browser program such that the web browser program contacts the web server at the specified network address, requests the files needed to display the web page from the web server at that network address, receives the files from the web server, and then displays the web page on the display of the local personal computer system.

Most internet based commercial businesses operate by placing server computer systems on the internet such that consumers may access their server computer systems using personal computers, cellular telephones, and any other type of consumer owned computer system that is coupled to the Internet. Virtually all internet based commercial businesses provide a web site that acts at least as an initial contact point for internet based consumers. Continued contact with the consumers may be through that web site or through other means such as telephone, email, or a custom application downloaded by the consumer onto the consumer's computer system.

Storage Operations on the Internet

Many internet based businesses require providing storage space to clients that use an internet service. For example, a web hosting service that hosts web sites for businesses that desire an easy way of creating a web presence must provide storage space for storing all of the web pages and images associated with the web site. Similarly, a social networking site that allows people to create easily their own personalized internet presence must allocate storage for each person that creates a web presence. Thus, storage (or other resource) allocation to customers is a fundamental aspect of many internet based businesses.

Most existing storage allocation systems operate by assigning individual user accounts to the various customers and then assigning storage limits to those individual user accounts. If a user attempts to use more storage than assigned to the user's account then the system will inform the user that the allocated storage has been exceeded.

A simple storage allocation system, such as set forth in the previous paragraph, operates effectively if the requirements of the system are limited. However, a very large and/or complex internet business that offers many different services each which may have different service levels requires a more sophisticated storage allocation system.

One difficult problem that may occur is when a particular service used by existing user account is removed and the common "shared" storage space allocated to that removed service and another remaining service is "borrowing" storage space over and above what that remaining service should be limited to. For example, a user may sign up for an introductory user account and receive an initial allocation of 3 GB of storage space. Later, when that same user signs up for an additional online service offering, that user may be allocated an additional 3 GB of storage such that the user now has been allocated 6 GB of storage space. This allocated storage space may be noted in a database record associated with that user's account. Thus, the user's account record will denote a total storage allocation (or quota) of 6 GB for that user. The user may then later decide to cancel the subscription to the second online service offering. But since the user's account now has 6 GB of combined storage the user's storage usage now exceeds the initial 3 GB limit given to the first service.

Quota Identifier Base Storage Operations

To remedy the problems presented within existing storage allocation systems, an alternative system for handling storage allocation is disclosed herein. The alternative storage allocation system is modelled on universal product codes (UPC) bar codes placed on consumer products. Specifically, a storage quota identifier (QUID) is a unique service quota allocation code associated with each service offering that requires storage space. This storage quota identifier (QUID) acts in a similar manner to a Universal Product Code (UPC) associated with a consumer product.

Universal Product Codes (UPCs) on consumer products allow a fixed unique identifier on a consumer product to be associated with other information about the consumer product that may vary. Specifically, the Universal Product Code for a product will remain constant but the information associated with that particular product may vary within the retail store's computer system that links information with the UPC. For example, if the price of a particular consumer product is reduced, only the price value in the computer system needs to be changed instead of changing the price on every instance of the product. In the disclosed storage allocation system the consumer storage space is associated with one or more QUIDs that are linked to storage allocation amounts. Thus, if the storage allocation of a particular online service offering is changed, then that storage allocation amount associated with the QUID only needs to be changed in one location and not within every individual user account that subscribes to that particular online service offering.

In one particular embodiment, the proposed storage quota system is broken down into two parts: The creation of a storage quota identifier (known as a "QUID" in this document by combining 'Quota' and Identifier') and application of the storage quota identifier (QUID). The creation of a storage quota identifier (QUID) is an administration task that may take place when a new type service offering is created or as necessary for needed storage expansion. The application of a storage quota identifier (QUID) refers to usage of the QUID with respect to a specific user's account.

A quota identifier (QUID) may comprise two different parts: an identifier (hereinafter referred to as an "ID") that does not vary and an associated storage quota value which may vary if storage allocations are changed. Following the Universal Product Code (UPC) analogy, the ID portion is similar to the unique non-changing UPC code of a product and the storage quota value is similar to the changeable price of the product having that UPC code In one specific embodiment, the ID is a combination of an user account identifier and a unique word that is defined by the QUID creator. This QUID is stored internally in the storage system in a single location. The storage quota value sets a maximum size on allocated storage space (sometimes referred to as a "bucket" in this document since the storage space is analogized to a bucket for storing items) that can not be exceeded. However, storage quota values may be combined as will be set forth later.

Once a particular quota identifier (QUID) and its associated storage quota value have been created by an administrator, that quota identifier (QUID) can be applied to one or more buckets. In one embodiment, only the creator of a QUID (an administrator) can apply that QUID to a bucket for security reasons. Each bucket can have only one direct reference to a quota identifier (QUID). The one QUID that a bucket directly references is known as the 'base QUID' for that bucket. Any additional QUIDs associated with that bucket are known as extension QUIDs and are connected to the base QUID that has been associated with the bucket.

There are several different manners to modify the storage space allocated to a bucket as specified by a quota identifier (QUID) system. One method to modify the storage space is to directly change the storage quota value of the QUID within the storage system. This changes the storage quota value for all of the buckets associated with the same QUID. Another method is to apply a QUID extension to alter an existing base QUID for a particular user of the system. A QUID extension is a new QUID that is applied to a user account's reference to the base QUID.

These two exemplary methods of modifying a storage quota for a bucket are generally used in different situations. A change to the storage quota value associated with a base QUID will effect all the other buckets that are associated to that same base QUID. Thus, a change to the storage quota value associated with a base QUID is used when the storage allocation for a particular service level is globally changed since every bucket associated with that base QUID will have its storage allocation changed. The application of a QUID extension is a locally scoped change that only directly effects the users specified for that QUID extension. Specifically, only the user (or users) which reference the extension QUID will have their storage allocations changed In this manner, the disclosed storage allocation system provides methods for easily changing storage allocation quotas on both a global basis (by changing a single storage quota value associated with a base QUID that is associated with many buckets) or on a local user basis (by adding a QUID extension for that user).

Figure 2A:
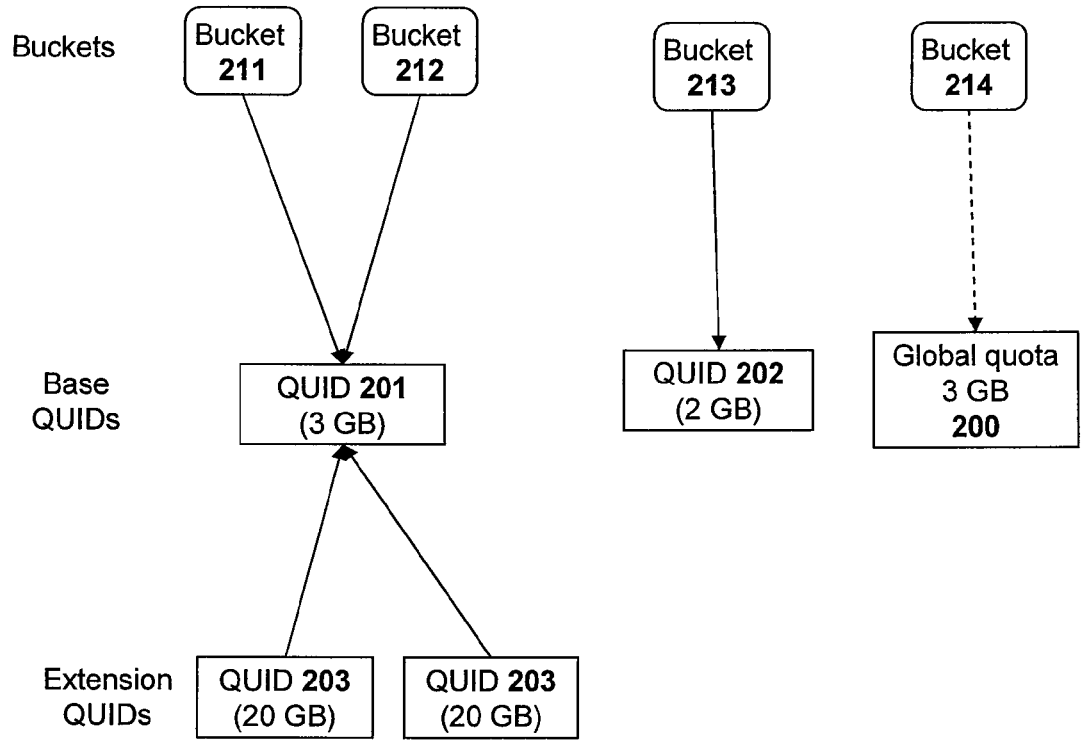
FIG. 2a illustrates a conceptual diagram of quota identifiers (QUID) and buckets.
Figure 2B:
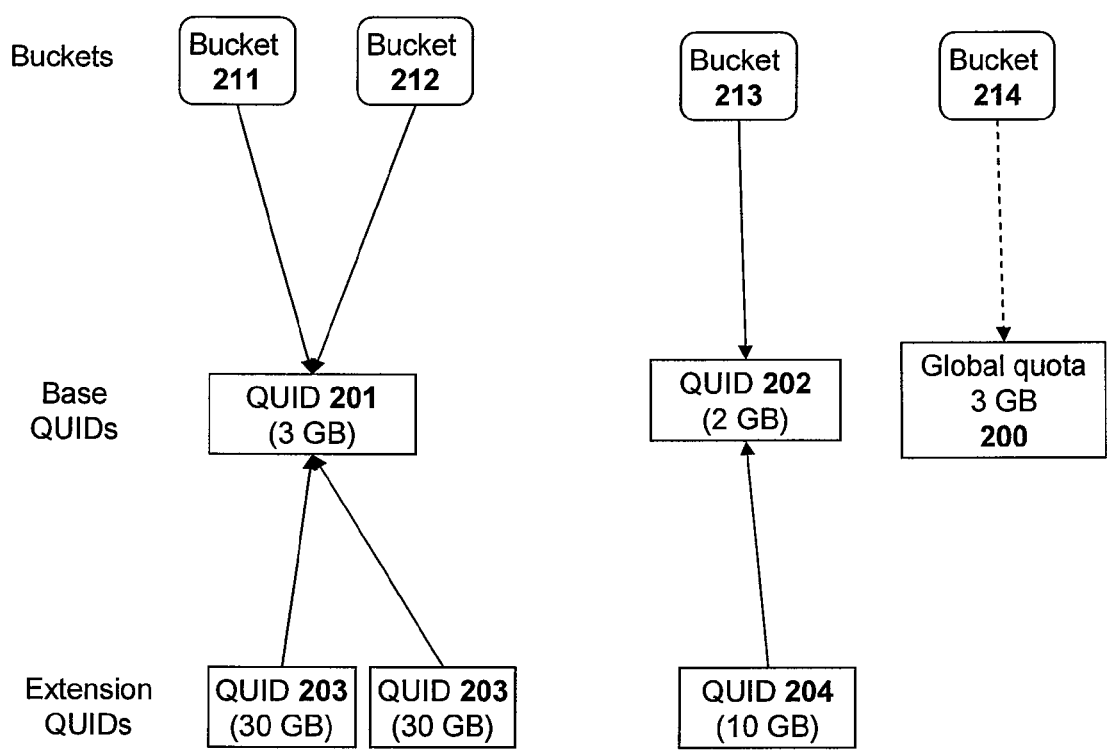
FIG. 2b illustrates the conceptual diagram of quota identifiers (QUID) and buckets of FIG. 2a after some of the QUIDs have been modified.

FIGS. 2a and 2b illustrate a conceptual diagram of quota identifiers (QUID) and buckets (storage space that may be allocated to user accounts). In the diagram of FIG. 2a, four buckets (allocated storage), three quota identifiers (QUIDs), and the single default global quota are illustrated.

In one particular embodiment, there are two at least two different types of quotas. One quota is a global quota and the other is a bucket quota. If a bucket quota is not specified for a particular bucket then the default global quota will be respected for that bucket. If a base QUID is specified for a bucket then the associated storage quota value for that QUID will be respected for that bucket.

In the case of a bucket with at least one associated QUID, a base QUID will be associated with the bucket. The same base QUID may be associated with additional buckets as well such that many buckets may be affected by changing the storage quota associated with that QUID. In one specific embodiment, each bucket will be associated with only a single base QUID. However, multiple QUID extensions may be added as set forth above that will allow for the storage quota set by the base QUID to be expanded.

Referring to FIG. 2a, buckets 211 and 212 share QUID 201 as their base QUID (having an associated storage quota value of 3 GB), and two instances of extension QUID 203 (having an associated storage quota value of 20 GB) are coupled to the base QUID as QUID extensions. When an extension is applied to a base QUID, a file is created that is linked to the user that has the base QUID and list of extensions for that user. That way the extension QUIDs only effect certain users associated with the extension QUIDs. Assuming that both bucket 211 and 212 are owned by users associated with the two extension QUIDs 203, the total amount of storage allowed for Buckets 211 and 212 combined is 43 GB (3 GB base QUID plus two instances of an extension QUID of 20 GB).

Bucket 213 in FIG. 2a is only associated with base QUID 202 (having an associated storage quota value of 2 GB), so it only allows for 2 GB of storage in that bucket. And Bucket 214 is not associated with any specific QUID and therefore is using the default global storage quota 200 set at 3 GB.

If a particular QUID has it's associated storage quota value changed at some later date, then all the buckets associated with that QUID will update their storage quota appropriately. Similarly, if an extension QUID is added for a particular customer, the bucket associated with that customer will receive the benefit of the added storage space. For example, if QUID 203 has it's value changed to 30 GB, then buckets 211 and 212 will automatically see an increase of 20 GB (63 GB total). Similarly, QUID 202 (associated with bucket 213) may receive an extension QUID 204 that provides an additional 10 GB of storage space. The final result is illustrated in FIG. 2b wherein QUID 202 now includes extension QUID 204 such that the total allocated space for bucket 213 is now 12 GB. Note that when a QUID extension is created, a remote_account value is specified and that remote_account value identifies the storage system user account ID that the new QUID extension will apply to.

Figure 3:
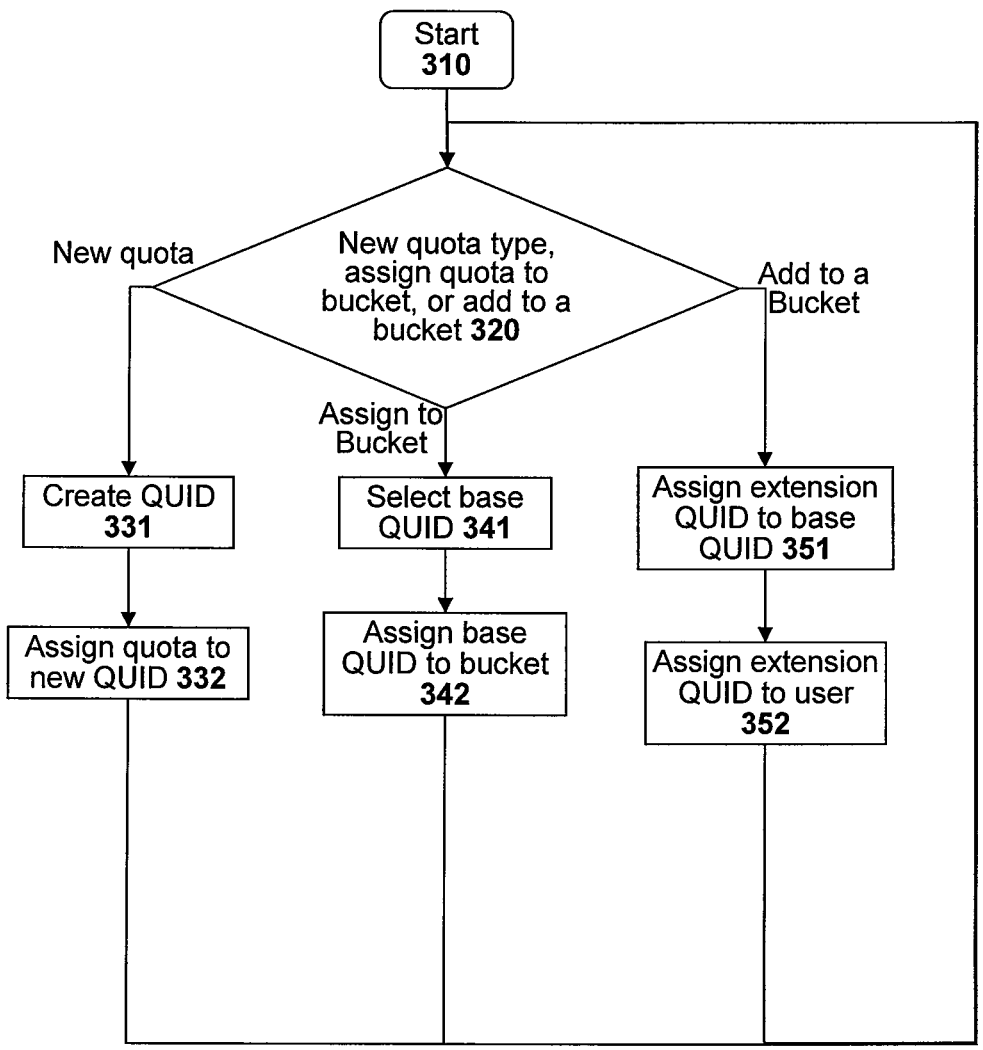
FIG. 3 illustrates a flow diagram describing how new QUIDs may be created, base QUIDs associated with buckets, and extension QUIDs added.

FIG. 3 illustrates a flow diagram that sets for the methods of creating new QUIDs and their associated quotes as well as assigning those QUIDs to buckets. The system starts at stage 310 and then proceeds to stage 320 where it waits for some type of storage allocation request from an administrator.

When a new type of service offering is created that will have its own specific quota amount of some resource associated with is created, an administrator will submit a request to create a new QUID such that the system proceeds to step 331. As set forth in the "Create QUID" section below, the administrator may specify a client identifier and a code that will be used to identify the new QUID and a resource quota value for the new QUID. The system then creates the new QUID at stage 331 and assigns the specified resource quota amount at stage 332. Note that both base QUIDs and extension QUIDs may be created with stages 331 and 332. At this point, the newly created QUID is ready to be used and the system proceeds back to stage 320 to wait for additional requests.

When a new user has signed up for a particular service, an administrator will need to assign resources to that new user. In the present example, storage space must be assigned to a new user's bucket. Thus, the system will receive a request to assign a base QUID to the new user's bucket. As set forth in the later "Add QUID" section, the administrator may specify a client identifier and a code identifying an existing QUID and an identifier for the user's bucket. The system will then select the specified base QUID at stage 341 and then assign that base QUID to the specified bucket. The user will then be able to use the resource up to the quota amount associated with the specified base QUID and the system proceeds back to stage 320 to wait for additional requests.

When a user has qualified for additional resources, an administrator will need to assign those additional resources to that user. In the present example, additional storage space must be assigned to the user's storage bucket. Thus, the system will receive a request to add an extension QUID for that user. As set forth in the later "Add QUID Extension" section, the administrator may specify a client identifier and a code identifying the base QUID already assigned to the user, an extension code to add to the client identifier to identify an extension QUID to add, and an identifier for the user's account. The system will then select the specified extension QUID and associate it with the specified base QUID at stage 351. Then, the system will then assign that extension QUID to the specified user account. The user will then be able to use the resource up to the quota amount of the specified base QUID plus the newly added extension QUID (plus any other extension QUIDs assigned to that base QUID and user). The system proceeds back to stage 320 to wait for additional requests.

In addition to creating QUIDs and allocating new resources, other maintenance operations may be performed by an administrator. For example, if the resource allocation for a particular service offering is changed, the quota amount of the base QUID can be changed with the "Update QUID" operation set forth below. This will change the resource allocation for all users of the service offering associated with that base QUID. If a particular QUID is no longer being used, that QUID can be deleted with the "Delete QUID" operation. If a particular user cancels a service offering, the user's bucket can be disassociated from the base QUID of that service offering with a "Remove QUID" operation. Similarly, if an added extension QUID has been applied for a user, that extension QUID may be removed from that user with the "Remove QUID Extension" operation.

In one embodiment, the updates to an associated storage quota value or an added QUID may not be reflected immediately due to a caching of the storage quota in a client application. For example, in one embodiment the client programs only check the storage quota values once an hour in order to reduce server load.

In one embodiment, a set of application programming interfaces (APIs) was used to implement the proposed storage allocation system. A first set of application programming interfaces (APIs) may be used by an administrator to create and administrate the buckets and their associated quota identifiers. The first interface is needed to allow administrators to set the quotas for the buckets created by the administrator. Once a particular quota has been set, an administrator may need to be able to reset the storage used if needed. During client application operation, the storage allocation system must be able to obtain the total quota for a client program (set of buckets) and get the total storage space used.

Administrators of the storage allocation system may make use of the following application programming interfaces to create QUIDs, adjust QUIDs, use QUIDs and delete QUIDs:

Create QUID (a Quota Value that can be Applied to One or More Buckets):
  Usage: POST only, on ADMIN API. Login is required. The administrator account that creates the QUID is the only account that can apply the QUID to a bucket or used the QUID as an extension.
  Input arguments:
    quota_client_id=client ID supplied by Storage system code=unique key to designate the new QUID (can be anything)
quota=a value in bytes greater than 0 (can be 0 for unlimited storage)
Example Usage:
quota_client_id=CLIENT_ID (client ID for an application)
code=free
quota=3221225472 (3 GB)
This will generate the new QUID: CLIENT_ID-free
Potential error codes:
illegal argument—quota_client_id not valid
illegal argument—quota is not greater than 0
permission denied—the QUID already exists
Update QUID (a Quota Value that can be Applied to a Bucket):
Usage: POST only, on ADMIN API. Login is required. In one embodiment, only the administrator account that creates the QUID can update the QUID, as well as the same rules for applying the QUID.
Input arguments:
quota_client_id=client ID supplied by Storage system
code=unique key to identify the QUID
quota=a value in bytes greater than 0 (can be 0 for unlimited storage)
Example Usage:
quota_client_id=CLIENT_ID (client ID for an application)
code=free
quota=3221225472 (3 GB)
This will update the QUID: CLIENT_ID-free to have a quote of 3221225472
Potential error codes:
illegal argument—quota_client_id not valid
illegal argument—quota is not greater than 0
permission denied—the QUID was authored by a different user
permission denied—the QUID does not exist
Delete QUID (a Quota Value that can be Applied to a Bucket):
Usage: POST only, on ADMIN API. Login is required. In one embodiment, only the administrator account that created a QUID is able to delete the QUID.
Input arguments:
quota_client_id=client ID supplied by Storage system
code=unique key to designate this QUID (which may be an extension or base QUID)
Example Usage:
quota_client_id=CLIENT_ID (client ID for an application)
code=free
This will delete the QUID: CLIENT_ID-free
Potential error codes:
illegal argument—quota_client_id not valid
permission denied—the QUID was authored by a different user
permission denied—the QUID does not exist
Get QUID (a Quota Value that can be Applied to a Bucket):
Usage: Via ADMIN API.
Input arguments:
quota_client_id=client ID supplied by Storage system
code=unique key to designate the QUID
Example Usage:
quota_client_id=PhotoProgram (client ID for Photography application)
code=free
This will return the information for the QUID: PhotoProgram-free
Returns:

```

<quid>
<quid> PhotoProgram-free</quid>
<quota_size>3221225472</quota_size>
<email>PhotoProgram@adobe.com</email>
</quid>

```

Potential error codes:
illegal argument—quota_client_id not valid
illegal argument—code is not valid
Add QUID to Bucket:
Usage: POST only, on ADMIN API. In one embodiment, only one base QUID can be associated with a bucket. A base QUID must be removed from a bucket before a new one can be associated. Login as QUID owner required to set QUID to bucket.
Input arguments:
bucket=identifier of the bucket to add the base QUID to
quota_client_id=client ID supplied by Storage system for the base QUID
code=unique key used to designate the base QUID
Example Usage:
bucket=12345
quota_client_id=CLIENT_ID (client ID for an application)
code=free
This will add the QUID: CLIENT_ID-free to the bucket 12345
Potential error codes:
not found—specified QUID is not found
permission denied—login required
permission denied—QUID can only be added by QUID owner
illegal argument—specified bucket does not exist
permission denied—bucket already associated with an existing base QUID
Remove QUID from Bucket:
Usage: POST only, on ADMIN API. Generally, only one base QUID can be associated with a bucket. Login as base QUID owner required to set QUID to bucket.
Input arguments:
bucket=the bucket you want to remove the base QUID from
quota_client_id=client ID supplied by the storage system for the base QUID
code=unique key used to designate the base QUID
Example Usage:
bucket=12345
quota_client_id=CLIENT_ID (client ID for an application)
code=free
This will delete the base QUID: CLIENT_ID-free from the bucket 12345
Potential error codes:
permission denied—login required
permission denied—QUID can only be removed by QUID owner
illegal argument—bucket does not exist
illegal argument—QUID not associated with the bucket
Add QUID Extension:
Usage: POST only, on ADMIN API. A base QUID can be extended for a user many times. Login as QUID owner required to add extension to existing QUID. A base QUID must be applied to at least one bucket for a user for an extension to be applied.

Input arguments:
remote_account=the storage system user account ID you want to add the QUID extension to
quota_client_id=client ID supplied by the storage system
base_code=unique key used to designate the base QUID for which an extension QUID is being added to.
extension_code=unique_key used to designate the new extension QUID to be applied Potential error codes:
not found—QUID is not found
permission denied—login required
permission denied—QUID can only be added by QUID owner
illegal argument—base code missing Remove QUID Extension:
Usage: POST only, on ADMIN API. A base QUID can be extended for a user many times. Login as QUID owner required to remove extension to existing QUID. A base QUID must be applied to at least one bucket for a user for an extension to be applied.

Input arguments:
remote_account=the storage system user account ID you want to remove the extension from
quota_client_id=client ID supplied by the storage system
base_code=unique key used to designate the base QUID
extension_code=unique_key used to designate the new extension QUID to be applied Potential error codes:
not found—the specified QUID was not found
permission denied—login required
permission denied—QUID can only be removed by QUID owner
illegal argument—base QUID code missing
illegal argument—QUID extension not associated with bucket An administrator may have needs for critical situations or testing. The following two APIs are for certain critical situations or testing.

Set Storage Usage:
Usage: POST only, on ADMIN API. Login required for remote account. Use the "sudo" feature to act on behalf of remote user. This should only be used in critical situations.

Input arguments:
used=new storage used value
quota_client_id=client ID supplied by the storage system
code=unique key used to designate the QUID
auth=the secret auth key Potential error codes:
permission denied—auth incorrect
permission denied—login required
illegal argument—QUID is invalid
illegal argument—QUID must be specified
illegal argument—storage value is negative Flush QUID Cache:
Usage: On ADMIN API. Login required as remote account. This is designed to help QE test functionality without relying on the cache.

Input arguments:
quota_client_id=client ID supplied by Storage system
code=unique key used to designate the QUID Potential error codes:
permission denied—login required
illegal argument—the QUID is not used by this user Client application programs generally are not given the authority to make any changes to the storage allocation system. Thus, client application programs can generally only access (read) the storage allocation values and the amount of storage used but cannot change those values. The following set of Application Programming Interfaces (APIs) may be used by client application programs in order to read the storage quota values.

Get Quota for QUID:
Usage: Login required as remote account. QUID must be associated with at least one of the user's buckets to get quota for QUID.

Input arguments:
quota_client_id=client ID supplied by storage system
code=unique key used to designate the (base) QUID
remote_account=the Storage system user account ID you want to get the quota for (optional, and only via admin port)

Returns:

```

<quota>
<quota_size>3221225472</quota_size>
</quota>

```

Potential error codes:
permission denied—login required
illegal argument—QUID is not associated with any buckets for user
not found—quota is invalid Get Storage Usage for QUID:
Usage: Login required as remote account. QUID must be associated with at least one of the user's buckets to get quota for QUID.

Input arguments:
quota_client_id=client ID supplied by Storage system
code=unique key used to designate the (base) QUID
remote_account=the Storage system user account ID you want to get the quota for (optional, and only via admin port)

Returns:

```

<quota>
<storage_used>14</storage_used>
</quota>

```

Potential error codes:
illegal argument—QUID is not associated with any buckets for user As set forth above, a method for allocating a computer resource is disclosed. However, The preceding description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A computer-implemented method of allocating resources in a computer system, said method comprising:
    creating a first quota identifier, said first quota identifier being a unique service quota
    al location code identifying a quota allocation of a first service and including a first quota value;
    assigning said first quota identifier to a plurality of users;
    creating a second quota identifier, said second quota identifier being a unique service quota allocation code identifying a quota allocation of a second service and including a second quota value;
    associating, using a processor, said second quota identifier to a first user of said plurality
    of users such that a total quota value for said first user comprises said first quota value and said
    second quota value; and
    modifying one of said first quota value of said first quota identifier or said second quota value of said second quota identifier resulting in a modified said total quota value for said first user;
    wherein said first quota value and second quota value comprises an indication of storage space.

2. The computer-implemented method of allocating resources in a computer system as set forth in claim 1, said method further comprising:
    removing said second quota identifier to reduce the resource allocation for said first user.

3. The computer-implemented method of allocating resources in a computer system as set forth in claim 1, wherein the modifying of said first quota value of said first quota identifier modifies quota values of all of said plurality of users.

4. The computer-implemented method of allocating resources in a computer system as set forth in claim 1, wherein the modifying comprising:
    modifying both the first said first quota value and said second quota value to modify said total quota value for said first user.

5. The computer-implemented method of allocating resources in a computer system as set forth in claim 1, said method further comprising:
    receiving a request from an application program to determine resource allocation quota for a user;
    calculating a total resource allocation for said user by summing quota allocations of quota identifiers associated with said user; and
    returning said total resource allocation.

6. The computer-implemented method of allocating resources in a computer system as set forth in claim 1 wherein said quota identifiers comprise a client application identifier and a code.

7. A system, said system comprising:
    a processor;
    a computer resource tracking system, said computer resource tracking system allowing a
    plurality of computer resource identifiers to be associated with a plurality of computer resource
    quota values; and
    a computer resource allocation system, said computer resource allocation system creating a first computer resource identifier with a first computer resource quota and assigning said first quota identifier to a plurality of users, said first computer resource
    identifier identifying a quota allocation of a first service,
    creating a second computer resource identifier with a second computer resource quota, said second computer resource identifier identifying a quota al location of a second service;
    wherein said first quota value and second quota value comprises an indication of storage space.

8. The system as set forth in claim 7 wherein removing said second computer resource identifier reduces the total resource allocation for said first user.

9. The system as set forth in claim 7 wherein modifying said first computer resource quota of said first computer resource identifier modifies computer resource quotas of all of said plurality of users.

10. The system as set forth in claim 7 wherein modifying said second computer resource quota of said second computer resource identifier only modifies said total quota value for said first user.

11. A non-transitory computer-readable medium, said computer-readable medium comprising
    instructions that, when executed by a machine, provides a method comprising:
    creating a first quota, identifier, said first quota identifier being a unique service quota
    allocation code identifying a quota allocation of a first service and including a first quota value;
    assigning said first quota identifier to a plurality of users;
    creating a second quota identifier, said second quota identifier being a unique service quota allocation code identifying a quota allocation of a second service and including a second quota value;
    associating said second quota identifier to said first quota identifier tbr a first user of said plurality of users such that a total quota value fi-)r said first user comprises said first quota value and said second quota value; and
    modifying one of said first quota value of said first quota identifier or said second quota value of said second quota identifier resulting in a modified said total quota value for said first user;
    wherein said first quota value and second quota value comprises an indication of storage space.

12. The non-transitory computer-readable medium as set in claim 11 wherein said method further comprises:
    removing said second quota identifier to reduce the storage allocation for said first user.

13. The non-transitory computer-readable medium as set forth in claim 11 wherein the modifying of said first quota value of said first quota identifier modifies quota values of all of said plurality of users.

14. The non-transitory computer-readable medium as set forth in claim 11 wherein the modifying comprises modifying both the first said first quota value and said second quota value to modify said total quota value for said first user.

15. The non-transitory computer-readable medium as set forth in claim 11 wherein said method further comprises:
   receiving a request from application program to determine resource allocation quota for a user;
   calculating a total resource allocation for said user by summing quota allocations of quota identifiers associated with said user; and
   returning said total resource allocation.

16. The non-transitory computer-readable medium as set forth in claim 15 wherein said quota identifiers comprise a client application identifier and a code.

17. A computer-implemented method of executing computer instructions on a computer system for allocating computer resources, said method comprising:
   executing instructions to create a first quota identifier, said first quota identifier being a unique service quota allocation code identifying a quota allocation of a first service and including a first quota value;
   executing instructions to assign said first quota identifier to a plurality of users;
   executing instructions to create a second quota identifier, said second quota identifier being a unique service quota allocation code identifying a quota allocation of a second service
   and including a second quota value;
   executing instructions, using a processor, to associate said second quota identifier to a first user of said plurality-of users such that a total quota for said first user comprises said first quota value and said second quota value; and
   executing instructions to modifying one of said first quota value of said first quota identifier or said second quota value of said second quota identifier resulting in a modified said total quota value for said first user;
   wherein said first quota value and second quota value comprises an indication of storage space.

18. The computer-implemented method of allocating resources in a computer system as set forth in claim 17, wherein the modifying of said first quota value of said first quota identifier modifies quota values of all of said plurality of users.

* * * * *